Sept. 29, 1970 E. SATHER 3,531,649

SCANNING APPARATUS HAVING PULSE GENERATING SYNCHRONIZER TO INDICATE POSITION OF SCANNER

Filed Dec. 28, 1966 3 Sheets-Sheet 1

INVENTOR
Eugene Sather

BY Griffin & Branigan
ATTORNEYS

Sept. 29, 1970 E. SATHER 3,531,649

SCANNING APPARATUS HAVING PULSE GENERATING SYNCHRONIZER TO INDICATE POSITION OF SCANNER

Filed Dec. 28, 1966 3 Sheets-Sheet 2

INVENTOR
Eugene Sather

BY Griffin & Branigan

ATTORNEYS

INVENTOR
Eugene Sather
BY Griffin & Branigan
ATTORNEYS 3,531,649
Patented Sept. 29, 1970

3,531,649

SCANNING APPARATUS HAVING PULSE GENERATING SYNCHRONIZER TO INDICATE POSITION OF SCANNER

Eugene Sather, Washington, N.J., assignor to Bell & Howell Company, Chicago, Ill.

Filed Dec. 28, 1966, Ser. No. 605,482
Int. Cl. G06k 7/10
U.S. Cl. 250—219 9 Claims

ABSTRACT OF THE DISCLOSURE

There is herein disclosed a document scanning apparatus having a movable scanning probe to generate signals in response to marks on a scanned document. The scanner is mechanically coupled to a synchronizer which generates pulses indicating the position of the scanner relative to the document.

This invention relates to a synchronized scanning system for determining both the presence and location of marks or other indicia on record forms. Because the invention finds particular utility in connection with inserting machines, it will be described in that environment. That is, in connection with machines which insert bills, payment cards, and other materials into envelopes.

The scanning systems of insertion machines are involved in two basic types of operations. One is to provide an input to a sequence checking system which senses marks placed on items to be assembled and detects whether the items are in proper order. A system of this type is more fully described in U.S. Pat. 3,262,696. The other basic type of operation is that in which a scanning system provides inputs to a plurality of insertion stations so as to control their operation. A system of this type is more fully described in U.S. Pat. 3,260,517. The structure of that patent is related to a means for controlling the selective insertion of inserts from a plurality of insertion stations.

It is a general object of this invention to provide an improved type of scanning mechanism that is suitable for use with both a sequence checking system and a selective control system.

One means of determining whether two documents are in a proper sequential order relative to each other is to scan and count a predetermined number of indicia on each of the two documents and then compare the two counts to determine whether they are in the proper relative order. This type of system, however, provides merely a total count of the indicia on a particular document. It does not provide any information as to the location of specific indicia. For example, in the case where a document is adapted to accommodate seven indicia in a given field on the document; if only five indicia were present the counter would not indicate whether it was the first five or the last five or some other combination of five marks that were contained on the document. In a system such as is described in U.S. Pat. 3,260,517, however, where it is desired to determine which particular indicia are in fact present on a document, merely counting these indicia is not satisfactory. Hence, plural scanning elements have been used whereby each possible indicia position has a corresponding scanning or sensing element which provides an output of some type only if the particular corresponding document position contains an indicium. Where it is desired to read a large number of indicia, however, this latter system becomes physically combersome and uneconomical because of the closely spaced large number of separate scanning elements that are required. Hence, it is a more specific object of this invention to provide a system which employs only a single scanning element adapted to sense indicia at a plurality of positions, but which nevertheless provides information both as to the number of indicia that are sensed and also as to their relative positions on the documents.

An advantage of a single element scanning system which provides positional information about a scanned document's indicia is that it can produce $2^n$ different outputs where $n$ is the number of a particular document's indicia positions. For example, if a document has seven indicia positions, a simple counting type of scanner can produce only eight different outputs, one of which corresponds to the situation where the document has no indicia recorded in any of its available positions. With a scanning mechanism of the type about to be described, however, the same document can give rise to $2^7$ or 128 different outputs.

In a system employing a single scanning element for detecting indicia placement, it is also necessary to determine the instantaneous position of the scanning element with respect to the document at any time that the scanning element detects an indicium. It is a still further object of this invention, therefore, to provide an apparatus for automatically reading a document's indicia in synchronism with the relative motion of the document with respect to the scanner.

In accordance with the principle of the invention a sensing probe is mechanically moved across a document and generates an output signal in response to each indicium on the thusly scanned document. At the same time a synchronizing means which is mechanically coupled to the sensing probe generates gating signals corresponding to each of a plurality of sensing probe positions corresponding to predetermined indicia positions on the scanned document. In this manner, the simultaneous occurrence of both a gating signal and a sensing probe output indicates the presence of an indicium at the corresponding one of the scanned documents' predetermined indicia positions.

The foregoing and other objects, features and advantages of this invention will be more apparent from the following more particular description of preferred embodiments thereof as illustrated in the accompanying drawings wherein the same reference numerals refer to the same parts throughout the various views. The drawings are not necessarily intended to be to scale, but rather are presented so as to illustrate the principles of the invention in clear form.

Figures 1, 2, 3, 4:
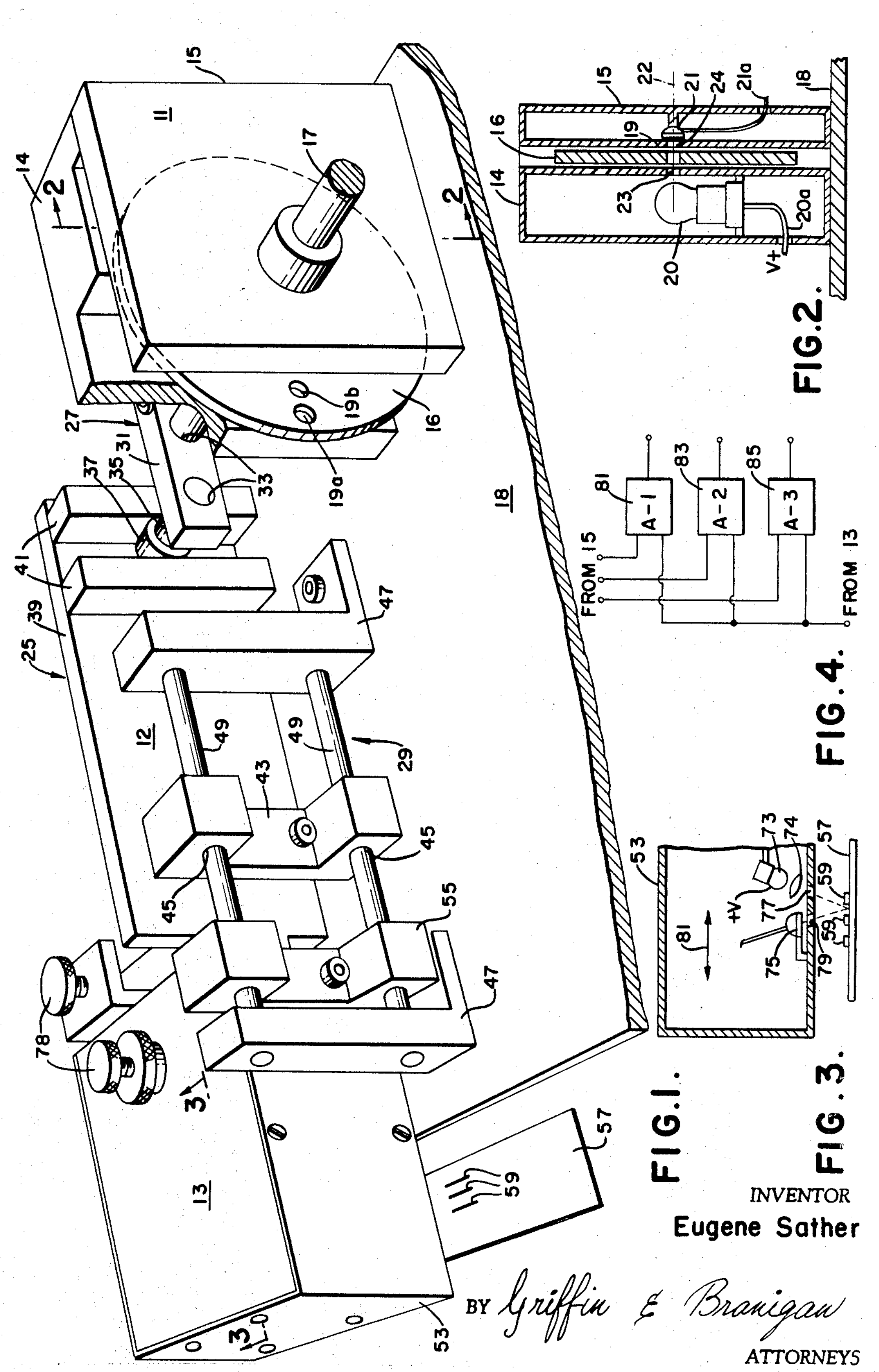
FIG. 1 is a perspective view, partially broken away, of a synchronized scanning mechanism embodying the principles of the invention.
FIG. 2 is a cross-sectional view taken along the lines 2—2 in FIG. 1.
FIG. 3 is a sectional view taken along the lines 3—3 in FIG. 1.
FIG. 4 is a line diagram of a simple logic circuit that is suitable for use with the embodiments of the invention illustrated in FIGS. 1 and 5.

The embodiment of the invention illustrated in FIG. 1 comprises a timing section 11, a coupling section 12, and a reading section 13.

The timing section includes a light housing member 14, a photocell housing member 15, a timing disc 16, and a first shaft 17. The photocell housing 15 is a relatively flat structure and the light housing 14 has a step-shaped, cross-section when viewed from the top. Both the step-shaped side of the light housing member 14 and the photocell housing member 15 are attached to a supporting plate 18 by any suitable means so that the two members face each other. In this manner, lights mounted in the light housing 14 emit light through holes in one of the risers of its step-shaped side so that the light passes through holes in one face of the photocell housing 15 to impinge on light sensitive elements mounted therein.

The first shaft 17 is rotatably mounted through the light and photocell housing members and at right angles to their operative faces as shown. The disc 16 is mounted between the light and photocell housing members and is fixedly attached to the shaft 17 by any suitable means so that it revolves with the shaft. In this embodiment, the disc 16 has a plurality of holes 19 preferably located along a radial line of the plate, as are holes **19*a* and 19*b***. These holes are so aligned that they pass between the holes of the light and photocell housing members. That is, as the disc revolves, its holes pass between the lights and the photocells so that the photocells generate signals each time the disc's holes so pass.

FIG. 2 is a cross-sectional view, along lines 2—2 of FIG. 1, of the light housing 14, the disc 16, and the photocell housing 15. Illustrated in FIG. 2 is a single lamp 20 mounted in the light housing member 14; however, this is only by way of a simplified example to show the cooperation between holes in the housing members and a hole in the timing disc—normally, as will be described more fully later, the housings contain a plurality of holes and lamps. Similarly, a single light detecting element 21 is illustrated as being mounted in the photocell housing 15. Normally, there is one light detecting element for each of a plurality of lamps; there being a different lamp-photocell combination for each mark position of the documents to be scanned. The lamp 20 and the light detecting element 21 are mounted along an axis 22 which is at right angles to the disc 16 and parallel to the first shaft 17. A first hole 23 is located on the inner face of the light housing 14 and a second hole 24 is located on the inner face of the photocell housing 15. Both of these holes are on the axis 22. The lamp 20 is connected to any suitable voltage source through a wire **20*a* and the output from the photocell 21 passes through the outer face of the photocell housing member along a wire 21**.

One of the disc's holes 19 is also illustrated as being located along the axis 22. Hence, at this point light rays are permitted to impinge on the illustrated light detecting element 21 so that it generates an output on wire **21*a*. As the disc 16 revolves, however, it cuts off this light, thereby cancelling the output on wire 21*a*. In this manner, as will be described more fully later, a timing or gating signal is generated each time one of the disc's holes passes between a lamp and its corresponding light detecting element. In this respect, it is to be understood that a single lamp or a single photocell is only for purposes of illustration. Normally, a plurality of lamps and photocells are used with a plurality of face holes 23 and 24. Or, alternatively, one lamp can have its rays suitably directed through a plurality of face holes to a plurality of photocells. In either event, except for the case where timing requirements are such that a single photocell can be permitted to generate plural timing signals each at a different time, there is always a correspondence between the number of photocells in the housing 15** and the number of possible indicia positions on the documents to be scanned.

More specifically, the timing disc, the lamps, and the photodetecting elements are intended to generate timing or gating pulses designating the location of the timing disc 16 and its shaft 17. This result is accomplished by having a radial row of timing holes 19 located in the disc 16 and by having a plurality of lamp-photodetector combinations located at different circumferential distances and on different radii from the axis of the shaft 17. That is, as the shaft revolves the holes in the disc pass through different lamp-detector combinations at different times; hence, the photodetectors generate timing pulses at different locations of the timing disc 16 and its shaft 17. As the disc 16 rotates, however, its more peripheral holes **19*a* travel at a greater speed than holes 19*b* which are located closer to the shaft 17. Hence, in order that the output pulses from all of the photocells be of equal duration, the holes 19*a* are larger than the holes 19*b* by an amount corresponding to the speed variation between the two. The same holds true for the remainder of the disc's holes which, for purposes of simplicity have not been specifically illustrated. Similarly, as will become more apparent later, the photocells and lamps should be arranged and spaced from each other within their housings so that they are aligned with the disc's holes 19 at substantially the same time that the reader section 13** is in a corresponding position with respect to the document being scanned. Because this will be more fully illustrated in connection with another embodiment however, it will not be further discussed at this time.

Returning now to FIG. 1, the coupling section 12 comprises a coupling structure generally indicated at 25, a crank structure generally indicated at 27, and a mounting structure generally indicated at 29. The crank structure 27 includes a crank bar 31 having a pair of parallel axised holes 33 for accommodating one end of the first shaft 17 and one end of a second shaft 35, respectively, so that the shafts extend outwardly from opposite sides of the crank bar 31. The shafts are pinned to the bar 31 so that bar 31 and the shaft 35 rotate with the shaft 17. At its free end the second shaft 35 has a roller bearing 37 which is loosely engaged within a runway comprised of two parallel bars 41. The runway is long enough for the second shaft 35 to revolve completely around the first shaft 17 without the roller bearing coming out from the ends of the parallel bars.

The coupling structure 25 comprises a coupling plate 39 having a greater length than width, the pair of parallel bars 41, and a first U-shaped member 43. The parallel bars 41 are mounted at one end of one face of the coupling plate 39 at right angles to its length. The U-shaped member 43 is fixedly attached at its cross member to the plate 39 on the same face as the parallel bars 41 with the cross member mounted parallel to the bars 41. Each leg of the U-shaped member has a hole 45 having an axis parallel to the face of the plate 39 as shown.

The mounting structure 29 of the coupling section 12 includes a pair of L-shaped members 47 and a pair of rods 49. Each L-shaped member has a pair of holes in its leg side with their axes parallel to the foot of the L to fixedly retain the rods 49. Hence, the rods are mounted in a parallel fashion between the legs of the L-shaped members. The feet of the L-shaped members are attached to the plate 18 as illustrated in FIG. 1; that is, they are mounted such that the rods 49 are parallel to both the coupling plate 39 and the supporting plate 18. The holes 45 in the U-shaped member 43 are large enough and of suitable location to fit over the rods 49. Because the coupling plate 39 is affixed to the U-shaped member, the parallel rods give support to the coupling plate 39 as it rectilinearly moves back and forth due to movement of the crank as hereinafter described.

In operation, as the first shaft 17 revolves, the second shaft 35 moves in a circumferential direction about the axis of the first shaft 17. Since the bearing end of the second shaft 35 fits between the parallel bars 41, they and the coupling plate 39 move back and forth in simple harmonic motion while the roller bearing 37 moves up and down between the bars 41. Hence, as the shaft 17 revolves the action of the first and second shafts and the parallel bar transforms rotation of shaft 17 to simple harmonic rectilinear motion of coupling plate 39.

The machine's reading section 13 includes a read head 53, and a second U-shaped member 55. The second U-shaped member is similar to the first U-shaped member, having a pair of holes—one in each leg—suitable for mounting over the rods 49. The second U-shaped member is fixedly attached to the read head 53 to support the head. In addition, the plate 39 is also adjustably attached to the read head 53 by any suitable means. Hence, when the plate moves back and forth, the reading section also moves back and forth in the same simple harmonic rectilinear manner.

Also illustrated in FIG. 1 is a record card 57 having a plurality of marks 59 located on one surface. The card 57 is adapted to move past the reading section 13 with the marks at right angles to its direction of movement; it may be on a conveyor belt, or any suitable transport means such as is shown in my previously issued U.S. Pat. 3,260,-517, for example. In any event, as shown, the reading section 13 is adapted to scan the marks 59 on the card 57 at a time when the card is held stationary.

FIG. 3 is a cross-sectional view further illustrating the reading section 13 of FIG. 1. The read head 53 in FIG. 3 holds a lamp 73, a focusing lens 74, and a light detecting element 75. The lower surface of the read head has a first hole 77 and a second hole 79. The first hole is aligned with the light 73 and the lens 74 allowing light rays to pass through it and impinge on the record card 57 passing beneath the head. Similarly, the second hole 79 is aligned with the light detecting element 74 so that light which is reflected from the card can impinge on the light sensitive surface of the element 75. In other words, the holes 77 and 79 are so aligned that when light passes through the first hole 77 and is reflected by the card 57, it passes through the second hole 79 and impinges on the light sensitive surface of element 75.

In this respect it should also be noted that the light, lens and detecting element are arranged at a suitable angle with the card so that the detecting element sees diffused reflection rather than specular reflection. In this manner, if for some reason the card is not flat the change in the angle of its reflected light has a minimal effect on the system.

Also schematically illustrated in FIG. 3 are the plurality of marks 59 on the upper face of the card 57. Further, the arrow 81 indicates the direction of the read head when moved by the system described in FIG. 1.

It will be appreciated that as the read head 53 moves back and forth the light reflected to the light detecting element 75 is varied by the marks 59 such as would occur if the marks are black and the card is white, for example. That is, although the light rays from the lamp are normally reflected from the card, they are not reflected by the black marks 59 and hence are prevented from impinging on the light sensitive surface. Consequently, as each black mark passes under the hole 77, the output from the light detecting element changes and generates a signal or readout pulse. In this respect, it should be noted that adjusting means 78 are provided to accommodate variations in mark positions between various types of documents or cards. For the type of document illustrated, however, there are three marks on the card and all are aligned under the read head. Hence, three pulses are generated by the light detecting element as the read head passes over the card 57.

It will also be appreciated that without some sort of location determining means it is not known at what points on the surface of the card 57 the marks 59 are located; it is only known that three marks exist. The synchronizing means within the timing section illustrated in FIG. 1 provides this desired information. That is, as will now be described, when a signal from the light detecting element 75 is suitably combined with the timing signals from light detecting element 21, both the location and existence of the marks 59 can be determined. A suitable electronic means for making this determination is illustrated in FIG. 4 wherein there are assumed to be three timing signals from means of the type illustrated in FIG. 2; each timing signal being generated for a different location of the disc 16 and hence the read head 53.

FIG. 4 comprises a first AND gate 81, a second AND gate 83 and a third AND gate 85. Each of the AND gates are dual input AND gates. The first input of the first AND gate 81 is connected to one output of the timing section. Similarly, the first input to the second AND gate 83 is connected to a second output of the timing section and, finally, a first input to the third AND gate 83 is connected to a third output of the timing section. The second inputs of the first, second, and third AND gates are all connected to the output from light detecting element 75. Now, when the element 75 generates an output pulse, it is only passed by one of the AND gates; and the gate which passes the pulse is the one which receives a timing pulse concurrently with the pulse from element 75.

More specifically, as the read head 53 is moved back and forth across the card, its photodetector 75 generates pulses for each mark read; these pulses occur at different head locations. Further, as the head moves back and forth, the timing disc revolves, creating timing pulses as the disc's holes move to different locations. Hence, there are read pulses for the marks (or a lack of read pulses if a mark does not occur at a particular location) and there are timing pulses for each point where a mark could occur. It is these pulses that are combined in the AND gates of FIG. 4. If a read pulse and a timing pulse occur concurrently, one—and only one—of the AND gates generates an output pulse. If a timing pulse occurs, but not read pulse occurs, then none of the gates generate an output pulse. It will be appreciated that for this arrangement the card 57 is stationary during the time it is being read and that its stationary position is fixed by appropriate card holding elements. However, if suitable means for synchronizing card movement with read head and timing disc movement are provided then the card can be moving when it is being read.

It will also be appreciated that the FIG. 3 read head 13 is only illustrative. For example, if the card's information was manifested by holes rather than marks, then the lamp 73 would be located on one side of the card 57 and the light detecting element 75 on the other. That is the lamp could be fixedly located below the card, and the light detecting element located in the moving read head. Or, the lamp could be located on one side of the card and the light detecting element on the other with both the lamp and the light detecting element being moved in a rectilinear fashion. Further, it will be appreciated that the system will read appropriately marked tape as well as cards; and that although only three marks have been illustrated, the system is easily adapted to handle documents having any reasonable number of marks. In fact, it is when more marks are read that the invention takes on greater utility because it is at this time that a reading head cannot conveniently accommodate a separate photocell corresponding to each mark. Moreover, the system will read magnetically recorded pulse data if a suitable magnetic read head is substituted for the optical read head hereinabove described.

Figures 5, 6, 7:
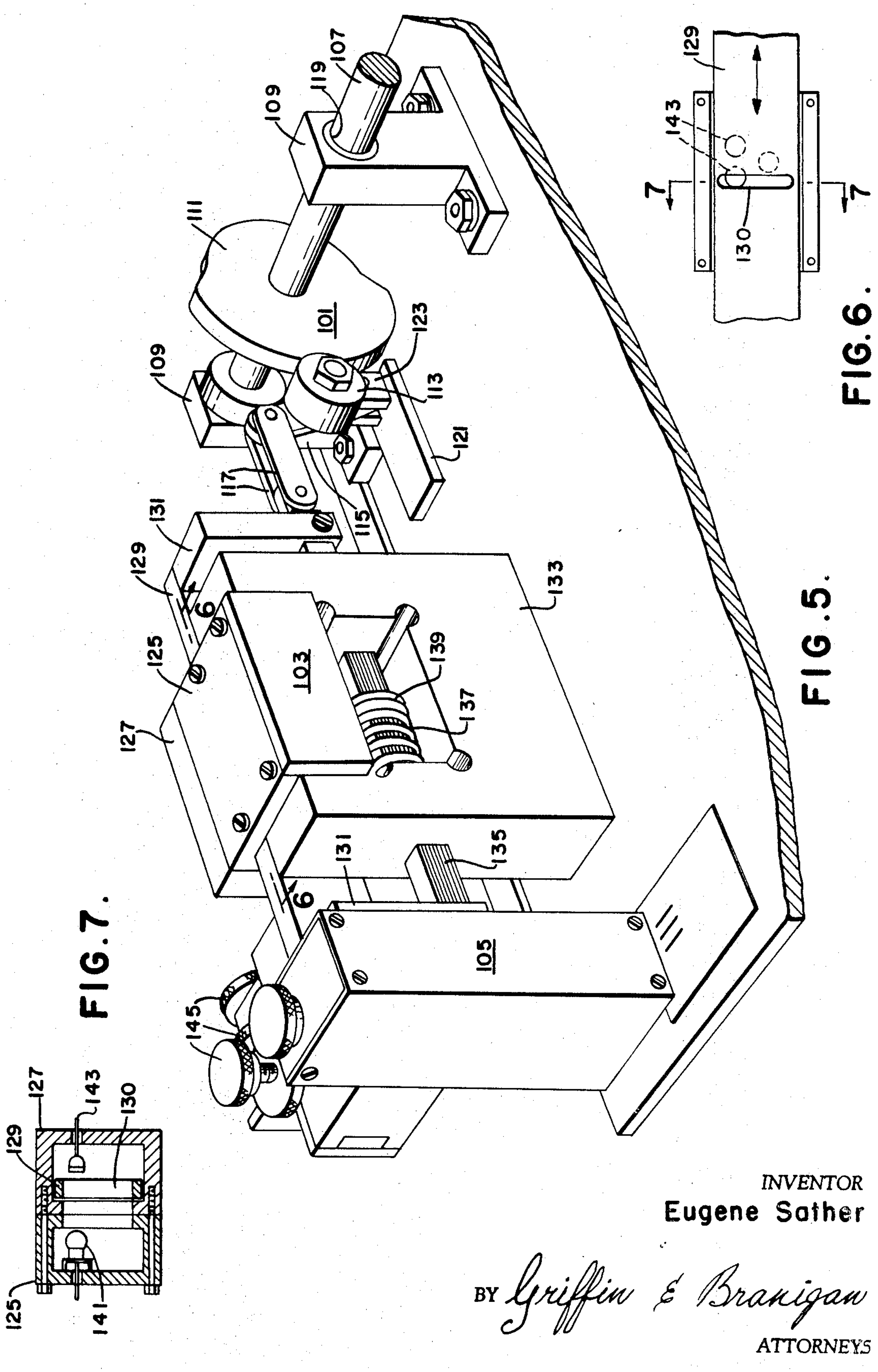
FIG. 5 is a perspective view of an alternative embodiment of the invention.
FIG. 6 is a sectional view taken along the lines 6—6 in FIG. 5.
FIG. 7 is a sectional view taken along the lines 7—7 in FIG. 6.

FIG. 5 illustrates an alternative embodiment of the invention comprising a drive section 101, a timing section 103, and a reading section 105.

The drive section includes a shaft 107, a pair of T-shaped support members 109, a cam 111, a cam follower 113, a flat bar 115, and a pair of links 117. The T-shaped supports are suitably affixed to the plate 18 in an inverted manner. The legs of the T have axially aligned holes 119 through which the shaft 107 is mounted. Mounted on the shaft is the cam 111. A support member 121 comprising a flat lower member having a pair of parallel upstanding flanges 123 is affixed to the plate 51. Each of the upstanding flanges 123 has an axially aligned hole. The flat bar 115 has three holes extending therethrough. One hole is near the center and one hole is near each end. One end hole of the flat bar 115 is coupled to the holes in the flanges 123 in a movable relationship by any suitable means—such as a pin, for example. The cam follower 113 is connected to the middle hole of the flat bar 115 and is in alignment with the cam 111. Hence, as the cam revolves it moves the cam follower back and forth causing the flat bar to move back and forth by pivoting it about the flanges 123. The links 117 are connected to the flat bar so that they too move back and forth as the cam rotates. By virtue of their greater distance from the pin connection at flanges 123, however, the links 117 move a greater distance than the cam follower 113.

The timing section 103 includes a light housing 125, a photocell housing 127, a timing plate 129, a pair of mounting members 131, a U-shaped support member 133, a support rod 135, a coil spring 137, and a retaining disc 139. The U-shaped support 133 is inverted and connected to the plate 18. Each leg of the U-shaped support member has a hole therein so that the support rod 135 can move through the legs. The coil spring 137 is mounted in the center of the U-shaped support about the support rod 135. The retaining disc 139 is fixedly attached to the support rod in between the legs of the U-shaped member to force the spring against one leg of the U-shaped member.

The lamp housing 125 is mounted between the legs of the U-shaped support member and above the support rod 135. The photocell housing 127 is fixedly attached to the plate 18 in alignment with the photocell housing member and, as shown in FIGS. 6 and 7, the timing plate 129 has a timing slot 130 therein which is adapted to be moved between the light and the photocell housings. As the timing plate 129 moves back and forth in FIG. 6, by means of FIG. 5's cam and linkage arrangement, it interrupts the light rays between lamps 141 and photocells 143. In this manner, the timing plate's slot 130 is adapted to provide a timing function similar to that provided by the holes in the disc of FIG. 1. The timing plate is attached by the support members 131 to the support rod 135 at points exterior to the legs of the U-shaped support. One end of the support rod has a hole that is attached to the links of the drive section by any suitable means such as a pin through the link's previously unconnected holes.

The reading section 105 is similar to the reading section of FIG. 1 and includes a read head fixedly attached to the timing plate 129 by any suitable means. Hence, as the timing plate 129 moves in and out, the read head moves back and forth to read the marks on cards or other documents. The outputs from the read head 105 and the photocells 143 are suitably connected together by an electronic means, such as is illustrated in FIG. 4, to provide a timed output signal as hereinabove described. Also as in FIG. 1, the read head 105 is equipped with adjusting elements 145 for aligning the read head with various types of documents.

It will be appreciated by those skilled in the art that while the embodiments of the invention illustrated in FIGS. 1 and 5 are generically similar, each has differences and advantages over the other, making them suitable for use in different environments. For example, the read head movement of the FIG. 1 embodiment is greater than that of the FIG. 5 embodiment. This is because of the crank arrangement as opposed to the cam arrangement. Hence, the FIG. 1 embodiment is better suited for use where larger numbers of marks are involved. In other words, the FIG. 1 embodiment can pass over a large number of marks in a single column and, therefore, has a greater reading capacity than the embodiment illustrated in FIG. 5. However, the embodiment illustrated in FIG. 5 is simpler than the embodiment illustrated in FIG. 1 because it uses the coupling plate of FIG. 1 to provide both a timing function as well as a coupling function.

In addition, for a given machine cycle the timing slot 130 in the FIG. 5 embodiment must pass between the lamps and photocells two times; once on the forward stroke and once on the backward stroke. Hence, unless corrected by using a double profile cam from a 1:2 ratio drive, this can give rise to false readings. Also, as can be noted from FIG. 6, in order to scan documents having marks that are desirably close together, it is necessary that the photocells 143 be placed in a staggered arrangement because of their physical size. The FIG. 1 embodiment's rotating disc type of timing arrangement, however, has neither of these drawbacks. That is, with the rotary gating structure, one disc revolution equals one machine cycle so that the timing holes 19 pass between their photocells and lamps only once during each machine cycle; and the distance between photocells is only limited by the size of the disc 16.

The FIG. 5 embodiment, on the other hand, also has certain other advantages over the FIG. 1 structure. Firstly, the FIG. 1 structure produces non-uniform harmonic motion of the scanning head as it passes over the document. Hence, as noted above, in order for the timing pulses to be in the desired synchronism with the pulses from the read head, the photocells in the housing 15 must be spaced apart from each other in accordance with the read head's simple harmonic motion. This, therefore, results in a complicated placement of the photocells and increases the structure's manufacturing costs. Secondly, because of the resultant speed variations of the FIG. 1 scanning head as it passes over the document, the duration of pulses from the head's photocell are different. This, therefore, makes it difficult to balance the structure's related electrical system. In addition, and also as noted above, because of their various peripheral speeds, the holes 19 in the scanning disc 16 must be of progressively larger dimensions as they become closer to the disc's periphery. The embodiment of the invention about to be described does not have the drawbacks of either the first or the second embodiment.

Figure 8:
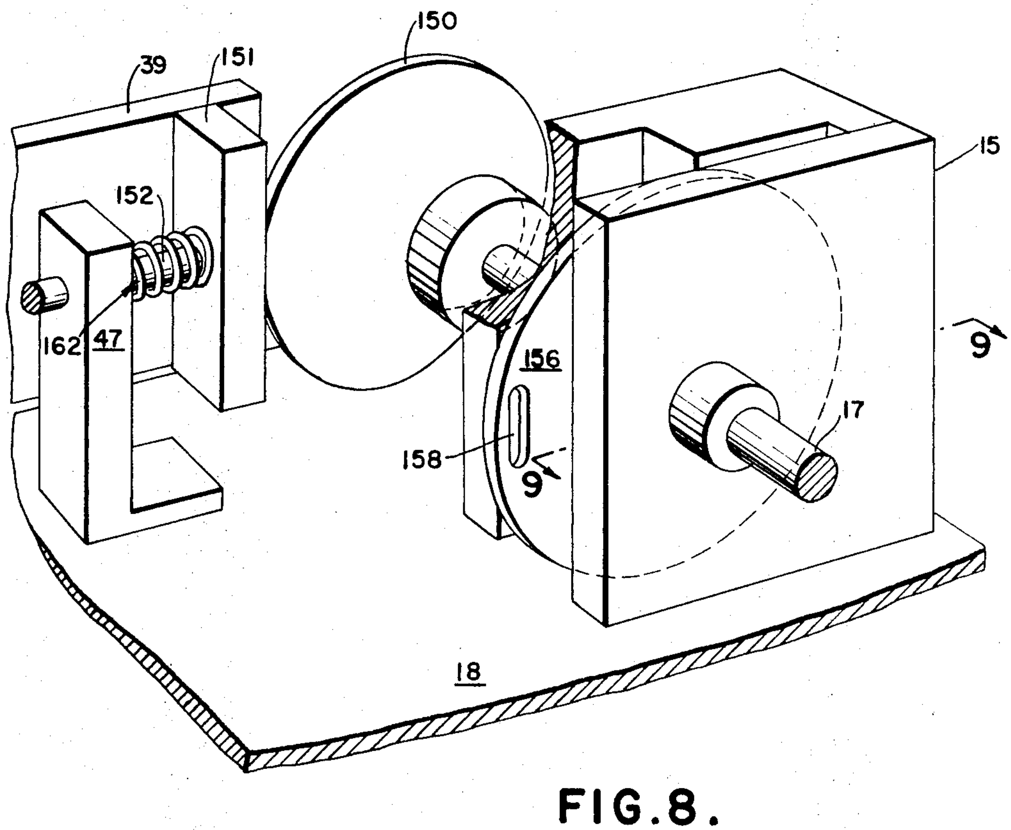
FIG. 8 is a fragmentary perspective view of still another alternative embodiment of the invention.

Turning now to FIG. 8, a third embodiment of the invention, although similar to that of FIG. 1, uses a constant velocity cam 150 on the end of the shaft 17 to drive a vertical bar 151 which is affixed to the coupling plate 39. A shaft 152 is surrounded by a spring 153 and slides through a suitable aperture in the L-shaped member 47. Hence, as the shaft 17 rotates, the cam 150 causes the support plate and thereby the reading head 13 (FIG. 1) to move back and forth at a relatively constant velocity, while the spring 153 urges the bar 151 into positive contact with the cam 150.

As in most constant velocity cam structures the end points of support plates 39's travel are actually something other than constant velocity. During the time that the read head passes over a given document's marks, however, its motion is substantially of a constant velocity.

Figure 9:
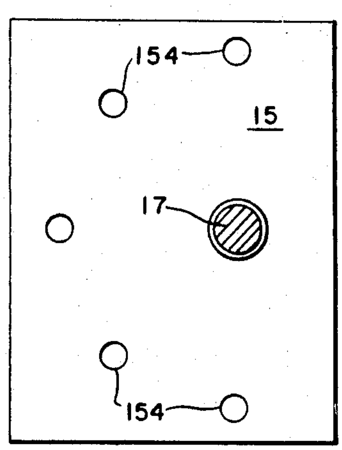
FIG. 9 is a vertical view of the FIG. 8 embodiment's timing photecell housing taken along the lines 9—9 of FIG. 8.

Hence, the read head's output pulses from a given document's marks are all of a substantially equal duration. Moreover, as indicated in FIG. 9, the photocells 154 in the housing 15 can be very simply equidistantly arranged about the circumference of a common circle. In addition, the timing disc 156 for this embodiment requires only a single elongated timing hole 158. This is because all of the photocells 154 are located equidistantly from the shaft 17 whereby the variously dimensioned holes 19*a* and 19*b* of the FIG. 1 embodiment are not required. This third embodiment's structure, therefore, requires neither the difficult and precise alignment of the gating photocells nor a balanced electrical system to distinguish between various lengths of read pulses. Similarly, it does not require a double profile cam to avoid false readings that can arise from the backstroke of the plate 129 in the FIG. 5 embodiment.

Although each of the above described embodiments of the invention has certain advantages over others, all of them provide an improved type of scanning mechanism that is suitable for use with either a sequence checking system or a selective control system. That is, the outputs from the AND gates 81, 83, and 85 of FIG. 4, can be delivered to either a comparison circuit for comparing it with a companion signal representing the document's proper sequence; or the signals from the AND gates can be delivered to an appropriate memory circuit which may be either mechanical or electronic. In this manner, as indicated in my U.S. Pat. 3,260,517, the stored signals can be used to selectively control subsequently operative insertion stations. Moreover, each of the above described embodiments requires only a single photocell in the scanning head whereby a large number of indicia can be read without requiring either specially designed photocell housings or a large number of scanning photocells per se. And, finally, all three of the embodiments provide an apparatus for automatically reading a document's indicia in synchronism with the relative motion of the structure's scanner as it passes over the document's indicia field.

While the invention has been particularly shown and described with reference to preferred embodiments thereof, it will be understood by those skilled in the art that various changes in form and detail may be made therein without departing from the spirit and scope of the invention. For example, although the illustrated embodiments have been described in connection with marks on cards, it will be apparent to those skilled in the art the invention is also applicable to devices which operate in connection with punched cards.

The embodiments of the invention in which an exclusive property or privilege is claimed are defined as follows:

1. In a document scanning mechanism of the type in which a scanning element generates output signals in response to indicia on a document as the scanning element moves relative to an indicia bearing field on the document, wherein the field is adapted to bear indicia at selected predetermined positions in said field, the improved combination comprising:

means for moving the scanning element relative to the indicia bearing field;

timing means for generating timing signals at a frequency corresponding to the relative motion between said scanning element and said predetermined positions in said field, said timing means comprising a rotary device for generating a timing signal at each of a plurality of predetermined rotary positions;

rotating drive means coupled to said rotary device for rotating said rotary device; and means for coupling said scanning element to said timing means so that said timing signals are generated at the same time that said scanning element generates each of said output signals, whereby the timing signals and the output signals are synchronized and the simultaneous occurence of both a timing signal and an output signal indicates the presence of an indicium at a particular one of said predetermined positions in said field.

2. In a document scanning mechanism of the type in which a scanning element generates output signals in response to indicia on a document as the scanning element moves relative to an indicia bearing field on the document, wherein the field is adapted to bear indicia at selected predetermined positions in said field, the improved combination comprising:

means for moving the scanning element relative to the indicia bearing field;

a source of radiant energy and a radiant energy sensitive element corresponding to each of said predetermined position:

timing means for generating timing signals at a frequency corresponding to the relative motion between said scanning element and said predetermined positions in said field, said timing means comprising a reciprocating plate movable between said radiant energy source and said radiant energy sensitive elements to normally block radiant energy from impinging upon said radiant energy sensitive elements, said plate having an aperture therein for permitting said radiant energy to sequentially impinge upon each of said radiant energy sensitive elements to generate timing signals; and means for coupling said scanning element to said timing means so that said timing signals are generated at the same time that said scanning element generates each of said output signals, whereby the timing signals and the output signals are synchronized and the simultaneous occurence of both a timing signal and an output signal indicates the presence of an indicium at a particular one of said predetermined positions in said field.

3. Apparatus according to claim 1 including a source of radiant energy and a radiant energy sensitive element corresponding to each of said predetermined positions; and wherein said rotary device is comprised of a disc rotatable between the radiant energy source and each radiant energy sensitive element to normally block the radiant energy from impinging upon said radiant energy sensitive element; said disc having an aperture therein for permitting said radiant energy to sequentially impinge upon each radiant energy sensitive element to generate said timing signals.

4. Apparatus according to claim 3 wherein the sequentially energized radiant energy sensitive elements are spaced apart from each other by a distance proportional to the time required for the scanning element to pass from one of the corresponding predetermined field positions to the other corresponding field positions.

5. Apparatus according to claim 4 including a substantially constant velocity cam connected between said rotary drive means and said scanning element for moving said scanning element across said indicia bearing field at a substantially constant velocity whereby the distances between sequentially operated radiant energy sensitive elements are all substantially equal.

6. Apparatus according to claim 4 including a crank connected between said rotary drive means and said scanning element so that said scanning element moves across said document in accordance with simple harmonic motion and said radiant energy sensitive elements are spaced accordingly.

7. Apparatus according to claim 4 including an AND gate corresponding to each of said predetermined positions and wherein the timing signals from each radiant energy sensitive elements are delivered to the corresponding AND gate along with each output signal from said scanning element so that an output from an AND gate indicates the presence of an indicium at the corresponding predetermined position.

8. Apparatus according to claim 2 wherein said plate moves said scanning element and said plate is reciprocated by a cam drive means.

9. Apparatus according to claim 2 including an AND gate corresponding to each of said predetermined positions and wherein the timing signal from each radiant energy sensitive element are delivered to the corresponding AND gate along with each output signal from said scanning element so that an output from an AND gate indicates the presence of an indicium at the corresponding predetermined position.

References Cited

UNITED STATES PATENTS

| | | | |
|---|---|---|---|
| 3,173,000 | 9/1965 | Johnson et al. | 250—219 |
| 3,222,453 | 12/1965 | Whitesell et al. | 178—7.6 |
| 3,229,073 | 1/1966 | Macker et al. | 235—61.11 |
| 3,060,319 | 10/1962 | Greunke. | |
| 3,173,000 | 3/1965 | Johnson et al. | |
| 3,238,357 | 3/1966 | Minka. | |

OTHER REFERENCES

Rohland: IBM Technical Disclosure Bulletin, vol. 8, No. 10, March 1966, pp. 1405–1406.

ARCHIE R. BORCHELT, Primary Examiner

M. ABRAMSON, Assistant Examiner